(No Model.)
G. P. KIDD.
WIRE STRETCHER.
No. 472,927. Patented Apr. 12, 1892.
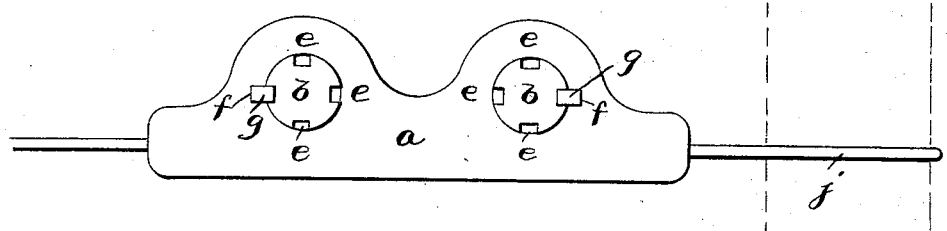
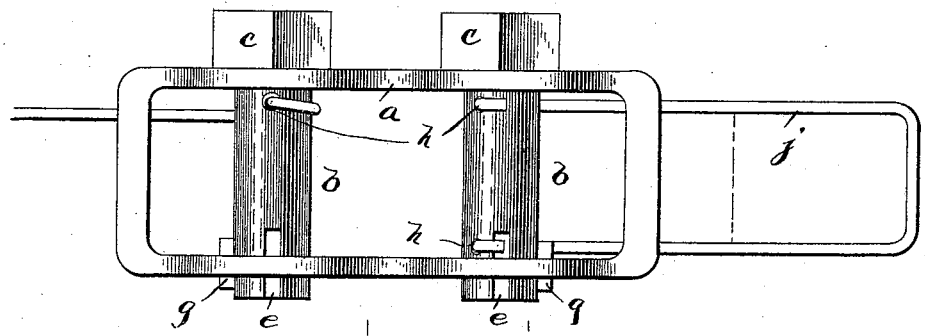
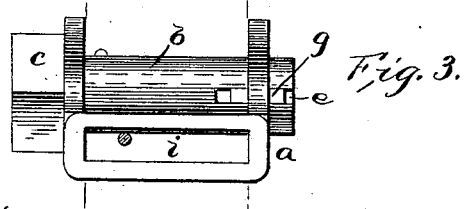
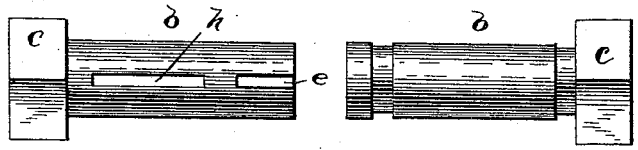
WITNESSES:
E. C. Duffy
H. E. Peck.
INVENTOR
G. P. Kidd
BY O. E. Duffy
ATTORNEY.

UNITED STATES PATENT OFFICE.

GIDEON P. KIDD, OF ROANN, ASSIGNOR OF ONE-HALF TO JAMES H. BARNHART, OF WABASH COUNTY, INDIANA.

WIRE-STRETCHER.

SPECIFICATION forming part of Letters Patent No. 472,927, dated April 12, 1892.

Application filed May 16, 1891. Serial No. 393,013. (No model.)

*To all whom it may concern:*

Be it known that I, GIDEON P. KIDD, of the town of Roann, in the county of Wabash and State of Indiana, have invented certain new and useful Improvements in Stretchers for Wire or Combination Fences; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in stretchers and fasteners for wire.

The object of the invention is to provide an improved, cheap, and durable wire fastener and stretcher exceedingly simple in construction and operation and sure and effective in securing and stretching the wire. These objects are accomplished by and this invention consists in certain novel features of construction and in combinations of parts more fully described hereinafter, and particularly pointed out in the claims.

Referring to the accompanying drawings, Figure 1 is an elevation of the stretcher. Fig. 2 is a plan view thereof. Fig. 3 is an end view thereof, and Figs. 4 and 5 are views of drums of different forms.

In the drawings, reference-letter *a* indicates the main frame of the drums, preferably open at the top and bottom, as shown, so as to form an elongated continuous loop having elongated parallel sides and comparatively short ends. The two drums *b* are mounted in this frame a suitable distance apart and preferably near the outer ends of the frame, this frame being preferably provided with enlarged portions to form secure bearings for the drums. Each drum is preferably in the form of a cylindrical bolt passing through and journaled in the two sides of the frame, and is at one end, outside of the frame, provided with an angular head *c* or other means, whereby it can be rotated. The opposite end of each bolt or winder is preferably provided with any suitable number (preferably four) of diametrically-opposite peripheral slots or seats *e*, arranged to register separately with the slot or seat *f* in the frame, and they are locked by keys *g*, inserted into the space formed by the seats *e f*, as is clearly evident and shown. Each bolt or winder is provided between the seats of the frame with one or more transverse apertures near its ends, as shown in Fig. 2, and the ends of the frames are provided with elongated slots *i*, preferably in the same plane as the lower sides of the two bolts, so that the wires extending from the lower sides of the bolts through the slots will not bind against the sides of the slots. By means of the elongated slots in the ends of the frame of substantially the same length as the portion of the bolts upon which the wire is wound the two ends of the wire can be kept so that they will pull in a straight line and in a line with the length of the frame without in any way binding on it. In practice the wire *j* is passed around a post and through the slot in an end of the frame, with its two ends through the two apertures of the bolt at that end, and then by turning the bolt the tightener is secured to the post at that end. The wire span is secured to the opposite bolt and extends to the opposite post, as is evident and obvious.

Of course the tightener can be used in the center of the span of wire, or can be operated through the end of the span and secured to the post, as here shown. The tension can be readily and quickly regulated and the bolts locked in the desired position by the seats and keys here shown. The bolts are here shown with four seats, so that each bolt can be fastened at every quarter-turn.

In Fig. 4 a bolt is shown with an elongated slot to receive the end of a span of ribbon-wire, and Fig. 5 shows a bolt having grooves to receive the seats of the frame to prevent the frame from spreading apart when under pressure during the tightening of the wire.

The many advantages and great simplicity of this device are obvious. The wire can be tightened and held taut by turning either bolt.

What I claim is—

1. The open frame having parallel sides and ends, the two independent parallel bolts or winders journaled in the sides of the frame, each having a head on one end, and locking means for said bolts or winders, consisting of seats and keys, each bolt or winder being provided with one or more transverse apertures to receive the wire ends, and the ends of the frame being provided with elongated slots for the passage of the wire.

2. A wire-stretcher consisting of the loop-frame having the end openings, the two parallel revoluble bolts mounted in the sides of said frame, locking means therefor, one bolt having an aperture to receive a fence-wire and the other bolt having two apertures, and the loop $j$, for the purpose set forth, having its ends secured in said apertures of the bolt.

3. A wire-stretcher consisting of the loop-frame having parallel sides and ends provided with elongated transverse openings $i$, the two parallel revoluble bolts mounted in the sides of the said frame parallel with the length of said openings $i$ and formed to receive and hold the wire ends, and locking means for said bolts, substantially as set forth.

4. A wire-stretcher consisting of the frame having raised bearings in its sides, the parallel revoluble bolts mounted in said raised bearings and formed to receive and hold wire ends, locking means for such bolts, the opposite frame ends having the elongated openings, with their lower edges located substantially in planes below or flush with the under surfaces of the respective bolts and substantially of the same length as the portions of the respective bolts between the sides of the frame, as set forth.

In testimony that I claim the foregoing as my own I affix my signature in presence of two witnesses.

GIDEON P. KIDD.

Witnesses:
BERTHA DICKEN,
JOHN H. DICKEN.